J. BAYNE.
INTERNAL COMBUSTION ENGINE.
APPLICATION FILED JAN. 4, 1912. RENEWED SEPT. 11, 1914.
1,133,458.
Patented Mar. 30, 1915.
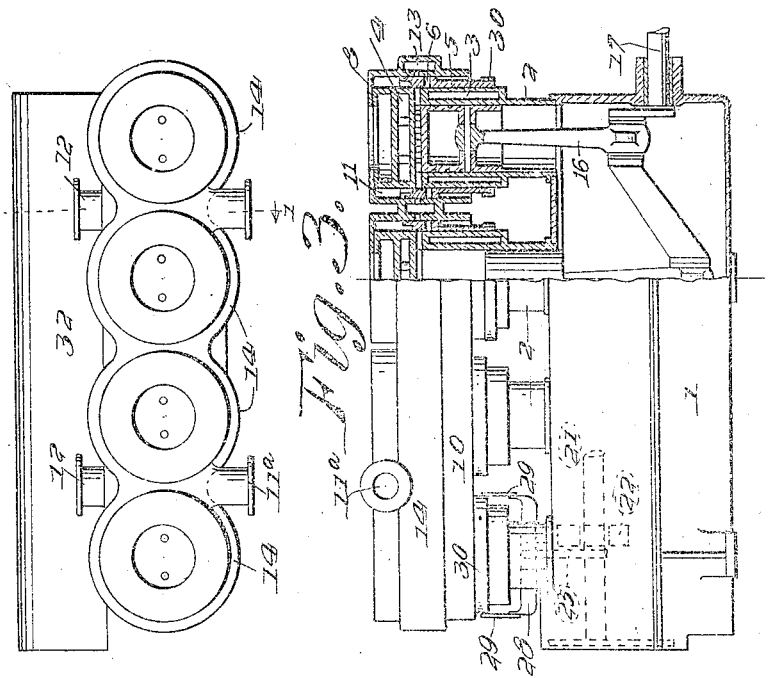
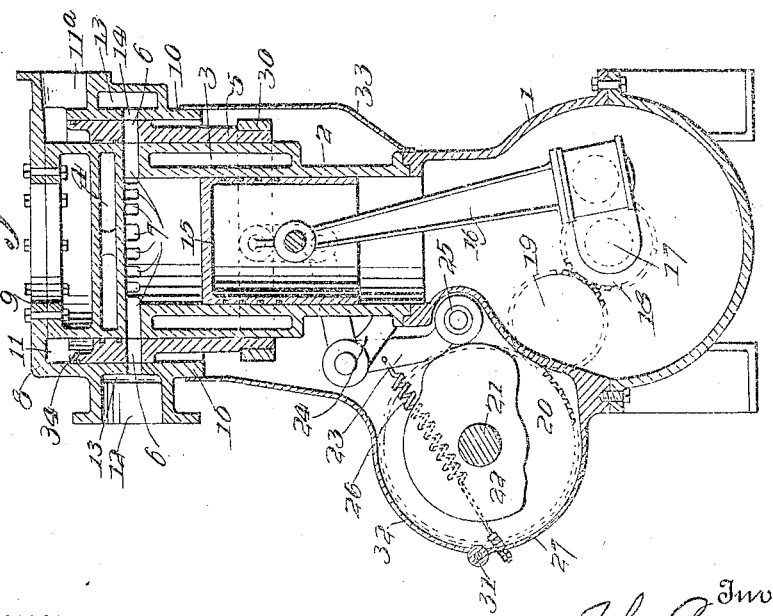
Witnesses:
L. R. Wood.
Frank Manning.
Inventor
John Bayne.
By H. E. Dunlap
Attorney

UNITED STATES PATENT OFFICE.

JOHN BAYNE, OF WHEELING, WEST VIRGINIA.

INTERNAL-COMBUSTION ENGINE.

1,133,458.

Specification of Letters Patent. Patented Mar. 30, 1915.

Application filed January 4, 1912, Serial No. 669,384. Renewed September 11, 1914. Serial No. 861,327.

*To all whom it may concern:*

Be it known that I, JOHN BAYNE, a citizen of the United States of America, and resident of Wheeling, county of Ohio, and State of West Virginia, have invented certain new and useful Improvements in Internal-Combustion Engines, of which the following is a specification.

This invention pertains to certain new and useful improvements in internal combustion engines, and comprehends the provision of an engine of this type of simple and economical construction, and one having a novel form of valve structure which is completely and positively opened to the inlet and exhaust permitting the instantaneous entry of a charge and like exhaust of the burnt or spent gases.

A further object is to provide an engine of the character mentioned wherein provision is made for the quick direct discharge of the waste, or exhaust, gases, resulting in the practical elimination of back pressure in the exhaust passages and in a relative freedom of the cylinder walls from heat, overheating in the ordinary types of engine being in most cases due to the fact that the areas of the discharge passages are unduly restricted, resulting in the retention of much of the heat generated by the explosion.

A further object is to provide an engine wherein the employment of puppet valves with their attendant springs and hammering noises are wholly dispensed with and wherein friction of the moving parts, with attendant wear and necessity for lubrication, is reduced to a minimum.

A still further object of the invention is to provide a structure in which the parts can be easily and quickly taken apart to permit of cleaning thereof.

A further object within the contemplation of the invention is to provide a valve for controlling the admission and exhaust of the gases which operates over a water jacketed surface, and which, consequently, is not subjected to the high temperatures incident to contact with the walls of the ordinary types of internal combustion engines.

With these and other objects in view, the invention resides in the features of construction, arrangement of parts, and combinations of elements which will hereinafter be fully described, reference being had to the accompanying drawings, in which—

Figure 1 is a transverse section taken through an engine cylinder constructed in conformity with my invention; Fig. 2 is a top plan view of a four cylinder engine embodying my invention; and Fig. 3 is a side elevation of the same partly in longitudinal section.

The invention is shown applied to a four cylinder engine in which the crank case 1 supports the cylinders 2, but one of which latter, with its associated parts, will, however, be described. As shown in Fig. 1, which is a section on line 1—1, Fig. 2, each cylinder has water jackets 3 and 4 encircling its side walls and top, respectively, and a sleeve valve 5 which closely embraces and slides over the periphery of the annular water jacketed portion of the cylinder. The sleeve valve 5 is formed with a circumferential row of ports 6 for register with a corresponding row of ports 7 formed in the cylinder 2 adjacent to the upper end thereof. To the upper end of the cylinder is secured a guide head 8, an inwardly extending flange 9 of the latter being bolted to the upper end of the cylinder, as shown. An inner cylindrical wall 10 of said head 8 closely embraces the sleeve valve 5, acting as a guide between which and the cylinder wall said valve operates. The head 8 is formed with an annular channel therein which communicates with a source of gas supply through a tubular side entrance 11ª, which is closed on its under side by the end of the slide valve 5 to constitute an intake passage 11; and said head has also an exhaust outlet 12 which communicates with an annular exhaust chamber 13 formed in said head. Ports 14 lead from said exhaust chamber through the wall 10 for registry with the ports 6 and 7 hereinbefore mentioned.

The piston 15 has its crank-rod 16 connected to the crank shaft 17 and the latter has a gear 18 suitably located thereon in mesh with an idle gear 19 which in turn meshes with a large gear 20 on a shaft 21, the latter being located parallel to the line of the crank shaft and being, preferably, the shaft to the magneto, although it may be provided specially for the purpose which will now be explained.

A cam 22 is rigidly mounted on shaft 21 adjacent to the cylinder, and by virtue of the gearing which connects said shaft with the crank shaft said cam is timed to make a single revolution to two revolutions of the crank shaft, whereby the cam moves through an arc of 90° on every stroke of the piston. A bell crank lever 23 is pivoted to an arm 24 which extends outwardly from the cylinder and has an anti-friction roller 25 on one of its ends in bearing contact with the periphery of the cam 22, a retractile coil spring 26 being secured to the bell crank and to a suitable fixed part, as the casing 27, to cause the roller 25 to engage with the periphery of the cam at all times. The opposite arm of the bell crank lever is bifurcated, as indicated at 28 in Fig. 3, and is connected by means of a pair of links 29 to the lower end of the sleeve valve 5, or to a collar 30 that is inset into the lower end of said sleeve valve, as shown. The casing 27 aforementioned incloses the cam 22 and associated parts, being adapted to contain oil or other lubricant, and has a hinged connection, as at 31, with a cover 32 which extends upward to a suitable height, as to the lower ends of the walls 10 of the guide heads 8. A cover 33 of any appropriate character is secured on the opposite sides of the cylinders between the lower ends of the walls 10 of guide heads 8 and the crank case 1. The cam 22 is formed so that an arc of 180° of the periphery thereof has the same radius throughout, and, as a consequence, the sleeve valve 5 is held stationary during the compression and explosion strokes in a neutral position—that is, in such a position that the upper end thereof maintains both the cylinder ports 7 and the exhaust ports 14 leading into the exhaust chamber 13 closed. When the piston has reached the end or limit of its explosion stroke, the roller 25 mounts a 90° arc of the cam's periphery, which arc is more remote from the shaft 21, thus instantly elevating the sleeve valve 5 to a point where the ports 6 thereof register with the cylinder ports 7, and with the exhaust ports 14, permitting the burnt or spent gases to exhaust on the return upward stroke of the piston. At the limit of the upward exhaust stroke of the piston, the roller 25 drops to a substantially straight chord-like surface or portion of the periphery of the cam, in which position it is nearer to the shaft 21, and the sleeve valve 5 is thus instantly moved downward to a position where an internal annular passage 34 provided at the upper end of the sleeve valve 5 registers with the cylinder ports 7, whereupon a fresh charge of gas is admitted from the annular inlet chamber 11. At the limit of the intake stroke the roller 25 again mounts the 180° arc of the periphery of the cam 22, instantly raising the sleeve valve 5 to a neutral position.

When it is desired to remove the sleeve valve 5 for any purpose, it is merely necessary to remove the guide head 8 and to disconnect the bell crank from the collar 30, whereupon the sleeve valve 5 can be simply raised up from the cylinder.

From the foregoing it will be seen that I provide an engine having an extremely simple valve construction which may be readily timed in its movements to the various piston strokes for effecting the instantaneous and timely admission and exhaust of the gases; an engine which is practically frictionless and noiseless in its operation, and which has but few parts liable to become out of order.

Having thus described my invention, what I claim as new, and desire to secure by Letters Patent, is—

1. In an internal combustion engine, the combination with a cylinder having peripheral ports, of a guide head secured to the cylinder and disposed in outer end of the cylinder and disposed in encircling relation thereto at a spaced distance therefrom, said guide head being formed with an intake passage and exhaust ports therein for communication with the cylinder ports, a sleeve valve slidably mounted in the space between said guide head and the cylinder and provided with ports for registry with the cylinder ports and those of said guide head, said sleeve valve being also formed with an internal passage at its outer end for registry with the cylinder ports, and means to actuate said sleeve valve from the engine shaft at predetermined intervals.

2. In an internal combustion engine, a cylinder having peripheral ports, a guide-head surrounding the cylinder at a spaced distance therefrom, said guide-head having an intake passage and exhaust ports therein, a sleeve valve slidably mounted between said cylinder and said guide-head and having ports adapted to permit of communication between the cylinder ports and the guide-head ports, said sleeve valve being also formed with an internal annular passage for permitting communication between said intake passage and said cylinder ports, and means intermediate said sleeve valve and the engine shaft for moving said valve at predetermined intervals.

3. In an internal combustion engine, a cylinder having peripheral ports, an annular water jacket about said cylinder, a guide-head surrounding said cylinder at a spaced distance from the outer wall of said water jacket, said guide-head having exhaust ports therein, a sleeve valve mounted to slide in the space between the water jacket and said guide-head and to form an intake passage between its outer end and the cylinder on one side and the guide-head on the other, said valve having an internal annular passage in open communication with said intake passage which is adapted, in one position of said valve, to register with said cylinder ports, said valve also having ports for permitting of communication between the cylinder ports and the exhaust ports of the guide-head, and means under the control of the engine shaft for imparting definite movements to said valve at predetermined intervals.

4. In an internal combustion engine, a cylinder having peripheral ports, a guide-head surrounding the cylinder in spaced relation thereto, said guide-head being formed with an intake passage and with exhaust ports, the latter being in alinement with the cylinder ports, a sleeve valve slidably mounted in the space between said guide-head and the cylinder and formed with ports for registry with the ports of the cylinder and of the guide-head, said sleeve valve being also formed with an internal passage at its outer end in communication with said intake passage and for registry with the cylinder ports and means driven by the engine shaft for imparting definite movements to said valve at predetermined intervals.

In testimony whereof I affix my signature in presence of two subscribing witnesses.

JOHN BAYNE.

Witnesses:
EDMUND WHITEHEAD,
H. E. DUNLAP.